United States Patent [19]
Stephan

[11] Patent Number: 5,227,050
[45] Date of Patent: Jul. 13, 1993

[54] FLOATING SUCTION EXTRACTOR FOR SKIMMING LIQUIDS HAVING A TENDENCY TO FOAM

[75] Inventor: Wolfgang Stephan, Grevenbroich, Fed. Rep. of Germany

[73] Assignee: Henkel Kommanditgesellschaft auf Aktien, Duesseldorf-Holthausen, Fed. Rep. of Germany

[21] Appl. No.: 842,116

[22] PCT Filed: Sep. 14, 1990

[86] PCT No.: PCT/EP90/01563
§ 371 Date: Mar. 23, 1992
§ 102(e) Date: Mar. 23, 1992

[87] PCT Pub. No.: WO91/04087
PCT Pub. Date: Apr. 4, 1991

[30] Foreign Application Priority Data

Sep. 21, 1989 [DE] Fed. Rep. of Germany ....... 3931680

[51] Int. Cl.$^5$ ............................................. B01D 21/24
[52] U.S. Cl. ................................ 210/106; 210/242.1; 210/330; 210/338; 210/341; 210/416.1; 210/409; 210/460; 210/540
[58] Field of Search ............ 210/106, 137, 209, 242.1, 210/242.3, 315, 320, 330, 416.1, 459–462, 512.1, 522, 538, 540, 409, 329, 341, 342, 337, 338; 55/178; 137/170.1, 577, 578, 590

[56] References Cited

U.S. PATENT DOCUMENTS

| | | | |
|---|---|---|---|
| 1,450,454 | 4/1923 | Hans | 210/122 |
| 2,957,579 | 10/1960 | McCombie | 210/460 |
| 4,132,645 | 1/1979 | Bottomley et al. | 210/104 |
| 4,997,556 | 3/1991 | Yano et al. | 210/512.1 |

FOREIGN PATENT DOCUMENTS

| | | | |
|---|---|---|---|
| 294002 | 12/1988 | European Pat. Off. | |
| 2706557 | 8/1978 | Fed. Rep. of Germany | 55/178 |
| 2560903 | 9/1985 | France | |
| 146460 | 11/1979 | Japan | 210/540 |
| 23297 | of 1913 | United Kingdom | 210/330 |

Primary Examiner—Matthew O. Savage
Attorney, Agent, or Firm—Ernest G. Szoke; Wayne C. Jaeschke; Kenneth Watov

[57] ABSTRACT

A device for taking up fluids likely to foam, especially emulsions, with a suction system having a suction pipe through which the fluid is taken up at one end, the suction pipe having an aperture at the end thereof, and a first container attached at the one end of the suction pipe, the container of which opens upwards in the operative position of the device which is so arranged that, in the operative position, only the fluid inside the container may be taken up by the suction pipe, the container having at least one aperture in its wall that lies, in the operative position, partly beneath the fluid surface, and with a float for positioning an edge of the container, in the operative position, above the fluid surface, in which there is a second external container surrounding the first container which also opens upwards in the operative position of the device and is so arranged that, in the operative position, only the fluid inside the outer container flows into the inner container and which has in its wall at least one aperture of which at least one is, in the operative position, at least partly under the fluid surface, so that in the operative position the edge of the second external container is above the fluid surface and the apertures of the second external container are staggered in relation to those of the first container in such a way that they do not lie on a radial line.

10 Claims, 11 Drawing Sheets

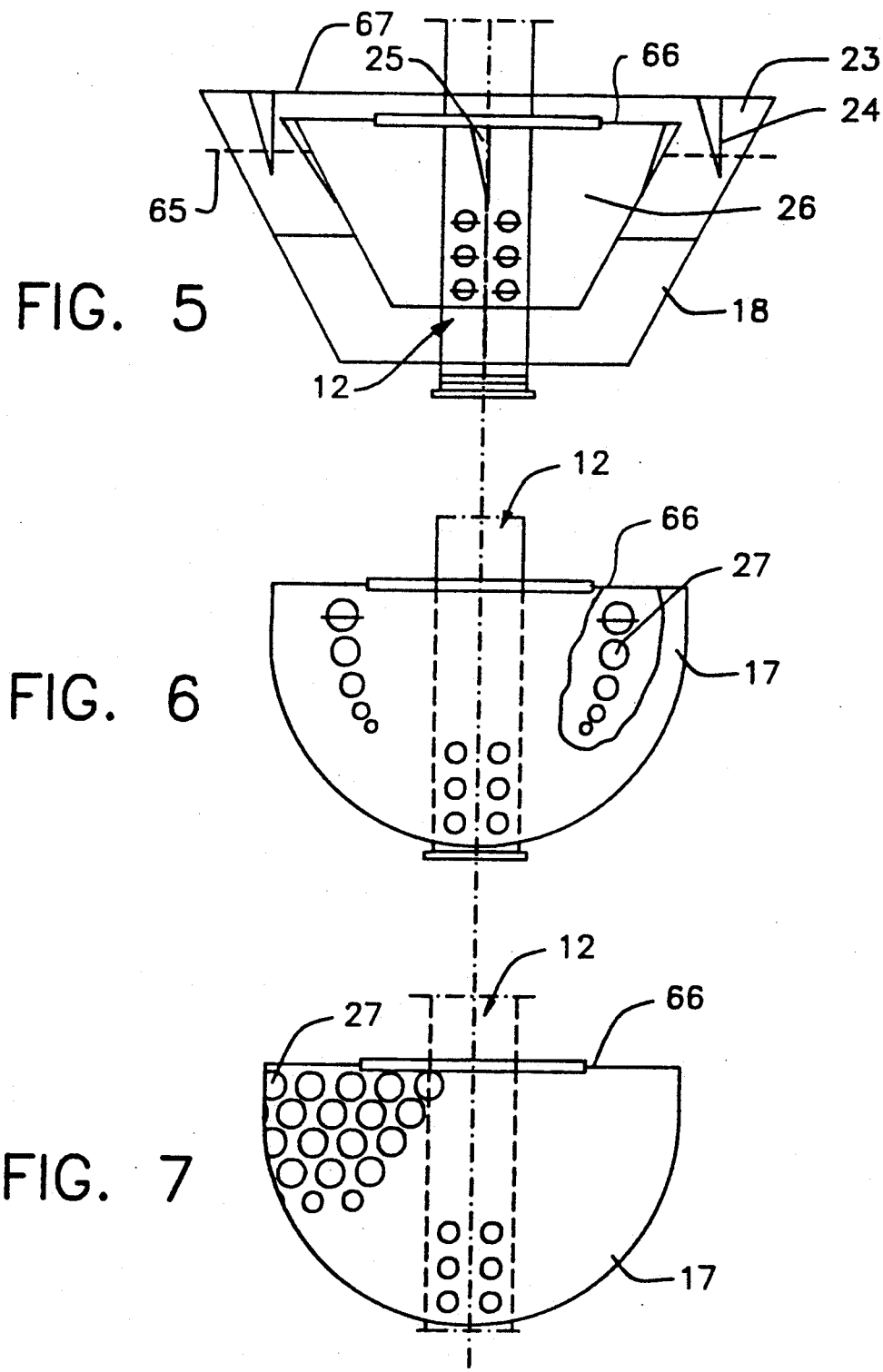

FLOATING SUCTION EXTRACTOR FOR SKIMMING LIQUIDS HAVING A TENDENCY TO FOAM

BACKGROUND

1. Field of the Invention

This invention relates generally to suction extractors for liquids, and more particularly to such extractors for liquids with a tendency to foam, such as emulsions.

2. Discussion of Related Art

One known suction extractor provides for extracting emulsions, particularly cooling lubricants. The suction-extracted emulsions are worked up, disposed of or tested in measuring arrangements, for example for pH values, conductivity, concentration and turbidity. As a result of foaming and soiling of the liquid, known suction extractors are vulnerable to clogging of the intake systems and also to the unwanted intake of air through foaming around the intake pipe.

SUMMARY OF THE INVENTION

Accordingly, an object of the present invention is to establish a relatively clean and foam-free environment around the intake pipe of a suction extractor in conjunction with a stable liquid surface, and to enable the intake system to be readily cleaned should blockages still occur. The present improved suction extractor in one embodiment includes an outer second bowl which surrounds an inner first bowl. The outer second bowl opens upwards in the working position of the suction extractor, which the latter is arranged in such a way that, in the working position, only the liquid situated inside the outer bowl flows into the inner bowl. The wall of the suction extractor has at least one opening that lies at least partly below the liquid surface in the working position. The rim of the outer bowl is positioned above the liquid surface in the working position and the openings of the outer bowl are offset relative to the openings of the inner bowl in such a way that they do not lie on a radial line.

The above-mentioned openings of the outer and inner bowls may be both holes and slots or may assume other corresponding forms. The openings of the bowls are offset so that the sludge and foam present in the liquid first settles in the outer bowl, and only the liquid freed from sludge and foam flows off into the inner bowl and hence into the space around the intake pipe. The bowls may assume any geometric form. The suction extractor according to the invention improves the transportability of the liquids to such an extent that liquids laden with solids, liquids of lower density than water and even liquids laden with agglomerated solids lower in density than water, turbulent liquids, and liquids in baths varying in their liquid level can be suction-extracted without difficulty.

In order further to improve the stability of the intake system floating on the liquid in another embodiment of the invention, closed hollow chambers are provided inside the outer bowl, particularly in its lower part.

To avoid the direct outflow of liquid from the outer bowl through the inner bowl into the intake pipe, and to ensure that sludge settles out and foam is retained, in another embodiment of the invention, the openings of the intake pipe are offset relative to the openings of the inner bowl in such a way that they do not lie on a radial line.

In the case of highly turbulent baths, the foam is retained particularly effectively by a foam collar arranged between the intake pipe and the inner bowl or between the inner bowl and the outer bowl in yet another embodiment of the invention. The foam collar is in the form of a cylindrical casing with openings which, in particular, are offset relative to the openings of the adjoining walls in such a way that they do not lie on a radial line. The function of the foam collar is to reduce foaming and to cover the inflowing liquid. The foam collar may readily be formed by a pipe collar.

In another embodiments in the event of turbulent movement of the liquid surface or major changes in the liquid level, the intake system is held in its position relative to the liquid surface by a universal joint between the intake pipe and the intake line leading away from the intake pipe.

In another embodiment of the suction extractor according to the invention, the foam on the surface of the liquid around the intake pipe is reduced by a pump in the intake line connected to the intake pipe, and by a valve controlled by the pressure in the intake pipe. The valve opens in the event of a fall in the pressure in the intake line lying on the pressure side of the pump, in a branch of the intake line leading to at least one nozzle which is aligned to spray the liquid onto the intake system. The latter consists of the intake pipe and the bowl or bowls. In this way, any grease floating on emulsions is uniformly dispersed and the intake system is additionally cleaned. The liquid is advantageously sprayed on through nozzles having a specific defined spray pattern in a preferred embodiment of the invention.

In conjunction with the above-mentioned nozzle, the branch and the valve, an upwardly open liquid-permeable basket surrounding the intake pipe and the bowl(s), and a float which is sufficiently deep so that the liquid surface lies above the bottom of the basket liquids having a tendency to foam excessively and having a very high solids content are extracted by the present extractor. By spraying the liquid onto the liquid surface surrounded by the basket, foaming is reduced and any agglomeration of solids is redispersed before the liquid enters the bowl of the intake system.

In order to avoid interrupting suction extraction of the liquid for the purpose of cleaning the intake system from time to time, the present suction extractor in another embodiment comprises a reversing joint on the intake line and arranged thereon, a second intake system which comprises at least one bowl and a second intake pipe, and which corresponds in its construction to the first intake system. The two intake systems are designed to be pivoted individually or together into and out of the liquid about the reversing joint, and a closure unit for closing the intake pipe of each intake system. In this manner, the suction extractor can easily be switched manually from one intake system to the other so that the intake system which has been removed from the liquid can be cleaned. To enable suction extraction of the liquids to be continued during cleaning, the openings of the intake pipe are closed by the closure unit. This change-over operation and the subsequent cleaning of the intake system can also take place automatically.

It is preferred that the bowl(s) of one or both intake systems are rigidly connected to the closure unit, and can be moved with it along the intake pipe. In this way, the bowl can be moved together with the closure unit, for example a stripper ring, along the intake pipe to remove any solids which have collected on the intake pipe. If this movement is made while the intake system is in the liquid, the solids which have collected can be flushed out at the same time.

BRIEF DESCRIPTION OF THE DRAWINGS

Several embodiments of the invention are described in detail in the following with reference to the accompanying drawings, in which like items are identified by the same reference designation, wherein:

FIGS. 3 to 5 are side elevations of suction extraction systems of various embodiments of the invention.

FIGS. 6 and 7 show further embodiments of the present suction extraction system.

DETAILED DESCRIPTION OF THE INVENTION

Figure 1:
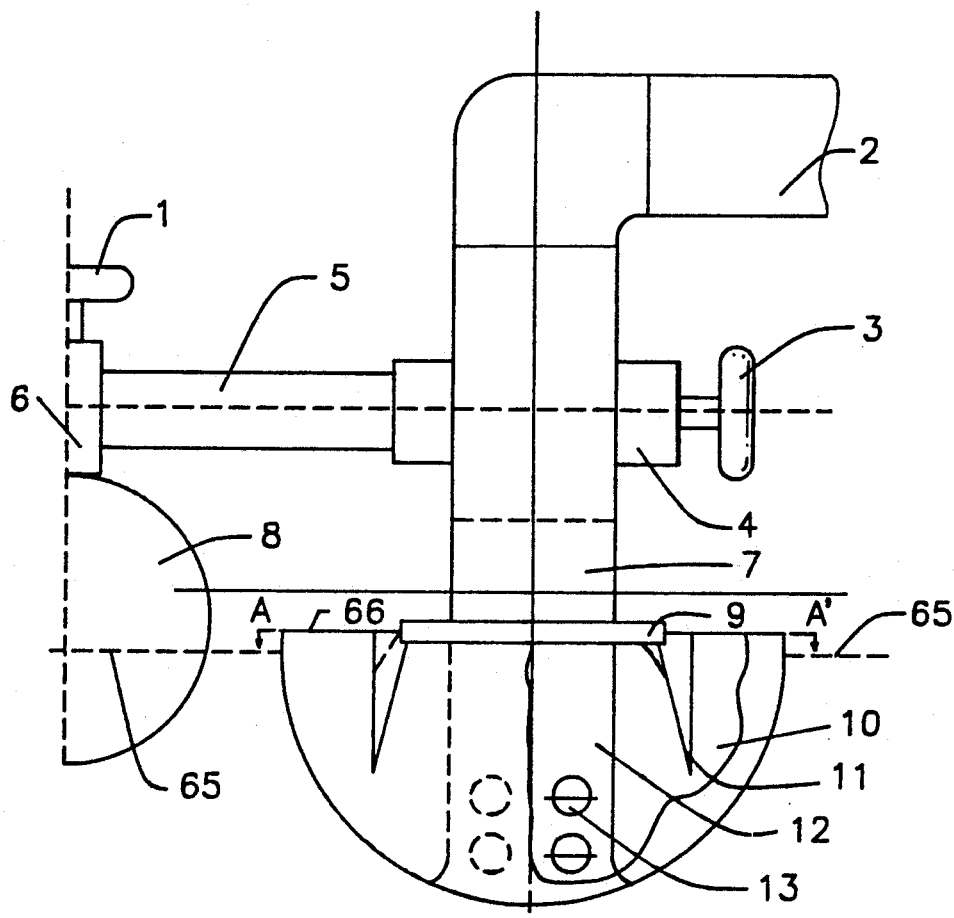
FIG. 1 is a side elevation of a known suction extractor.
Figure 2:
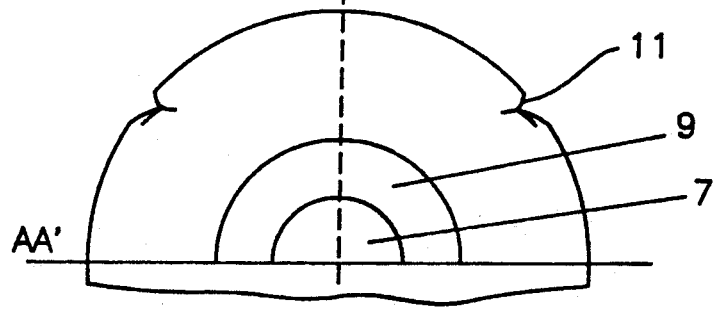
FIG. 2 is a section on the line A—A' in FIG. 1.
Figure 12:
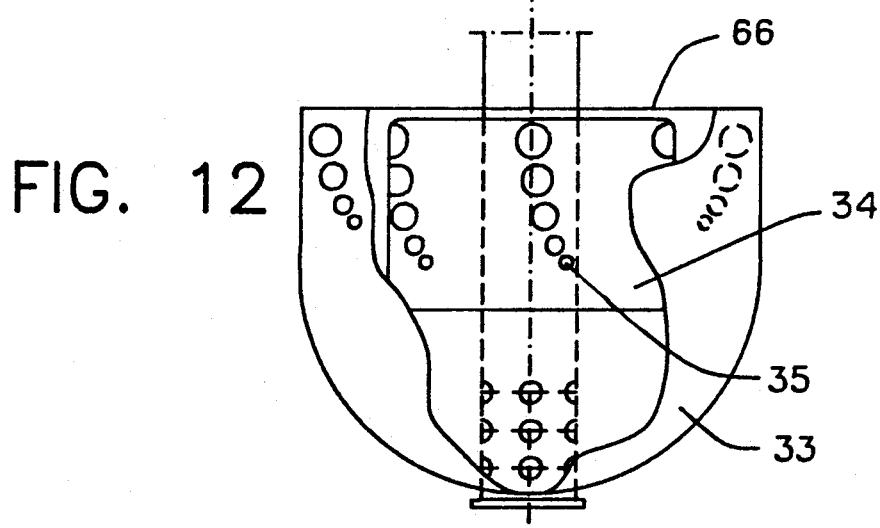
FIGS. 12 and 13 show suction extraction systems with a foam collar in other embodiments of the invention.
Figure 13:
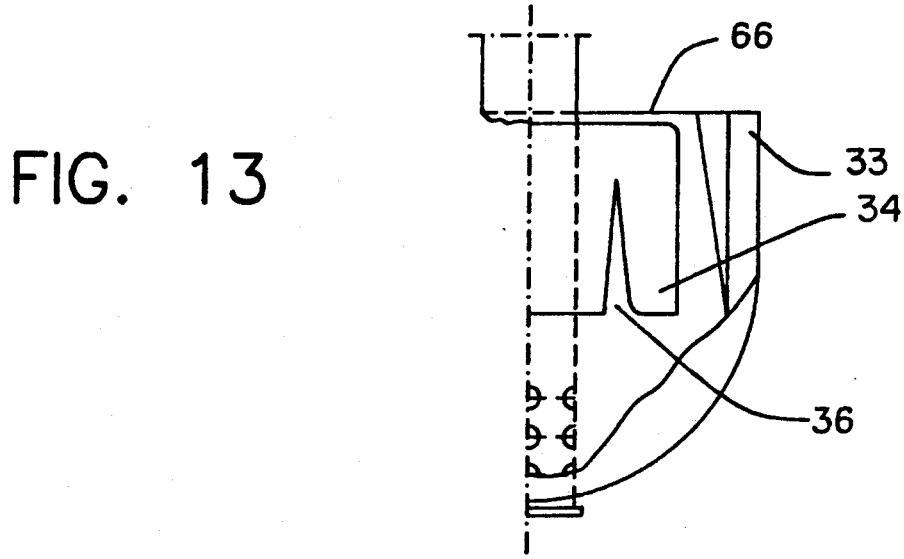

FIGS. 1 and 2 show a known suction extractor, for example of the P3 Multancenter type of Henkel KGaA (Germany). The liquid with its surface 65 is suction-extracted via the horizontal suction pipe 2 from the vertical intake pipe 7, which is connected to a bowl 10 in the form of an intake cup (hemispherical in shape) at its inner base. The intake cup 10 dips into the liquid which flows through the intake slot 11 into the bowl 10, and from there through openings 13 into the intake pipe 12. The intake slots 11 are offset in relation to the intake holes 13 in the vertical intake pipe 12, whereby the liquid first settles in the intake cup 10 before it enters the intake pipe 12. The pipe collar 9 acts as a foam collar to reduce foaming and to cover the inflowing liquid. Another two variants are shown in FIGS. 12 and 13 and are described hereinafter. The intake pipe portions 7,12 and the intake cup 10 are fixed to a float 8 by a holding ring or a holding clip 4 via a guide rod 5 and a guide sleeve 6. The float 8 keeps the intake system in the same position relative to the liquid level 65. The guide rod 5 and hence the position of the float 8 relative to the intake system can be adjusted with the setscrew 3 along the intake pipe 7. The float 8 is also adjustable on the guide rod 5 by means of a screw 1 and the guide sleeve 6.

Figure 3:
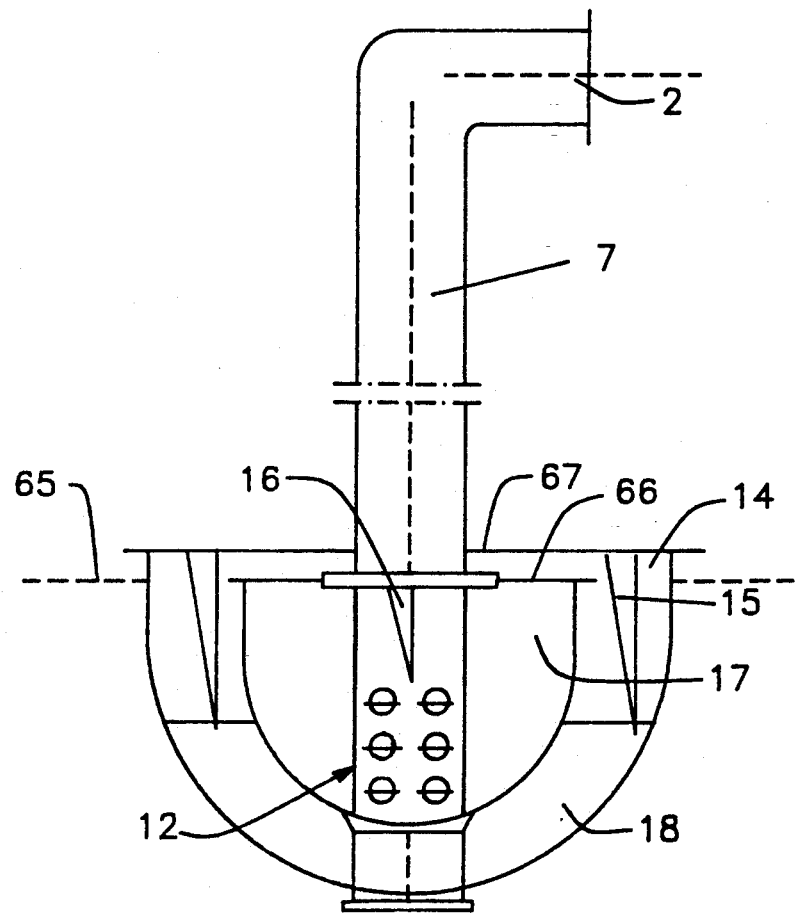
Figure 4:
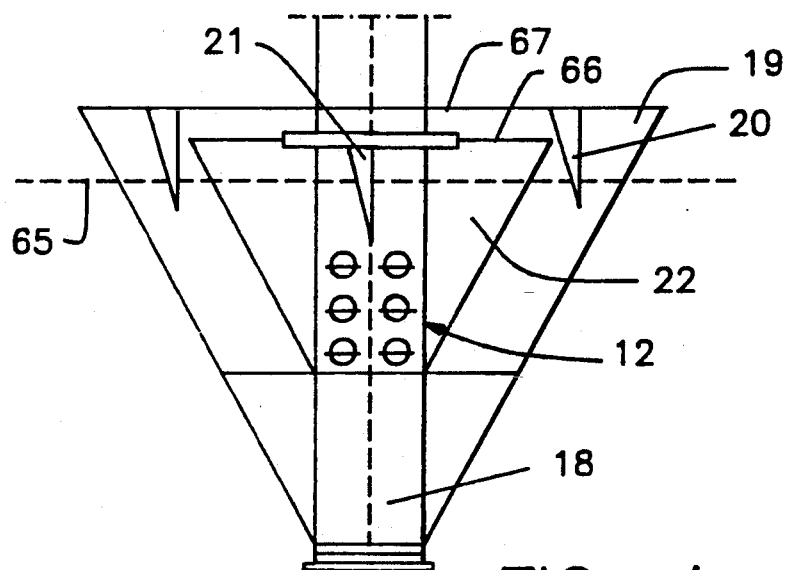

FIGS. 3 to 5 show various embodiments of the intake system according to the invention. Arranged concentrically around the inner cup or bowl 17 is another cup or outer cup 14. The inner cup or bowl 17 and outer cup 14 are substantially hemispherical in shape. The outer cup 14 and inner cup 17 have slots 15, 16 offset from one another. In addition, the intake system is stabilized by a hollow chamber or air chamber 18 within the liquid. This air chamber 18 is situated in the lower part of the outer cup 15.

FIG. 4 shows a similar arrangement except that the outer and inner bowls are in the form of an outer funnel 19 and inner funnel 22, respectively. The slots of the outer and inner funnels are denoted by the references 20 and 21, respectively. The same applies to FIG. 5, where the outer bowl 23 and the inner bowl 26 are in the form of truncated pyramids. The slots of the outer bowl and the inner bowl are respectively denoted by the reference numerals 24 and 25. The rims of the inner bowl and outer bowl are respectively denoted by the reference numerals 66 and 67.

FIGS. 6 and 7 show other embodiments for forming openings in the bowls. In FIG. 6, the slots have been replaced by holes 27 of different diameter arranged in several rows. In FIG. 7, the entire wall is provided with holes 27.

Figure 8:
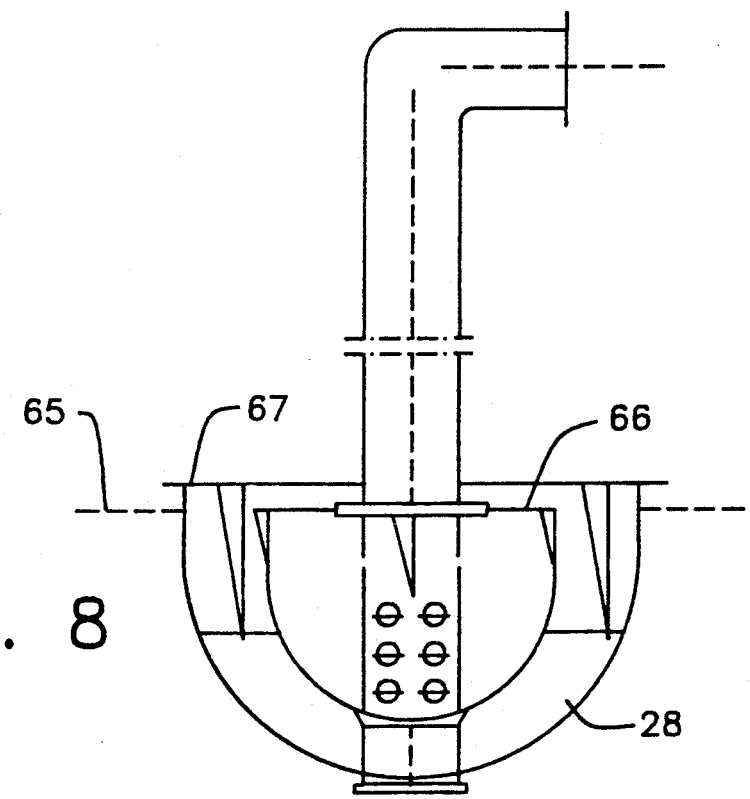
Figure 9:
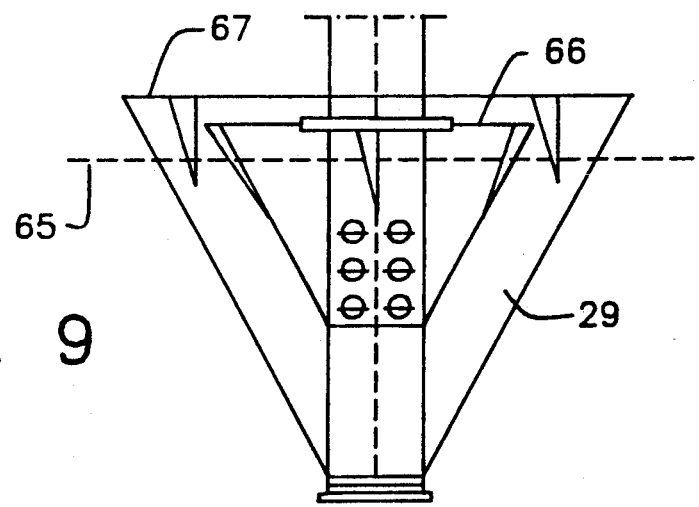
FIGS. 9 and 10 show the suction extraction systems illustrated in FIGS. 3 to 5, but without air chambers.
Figure 10:
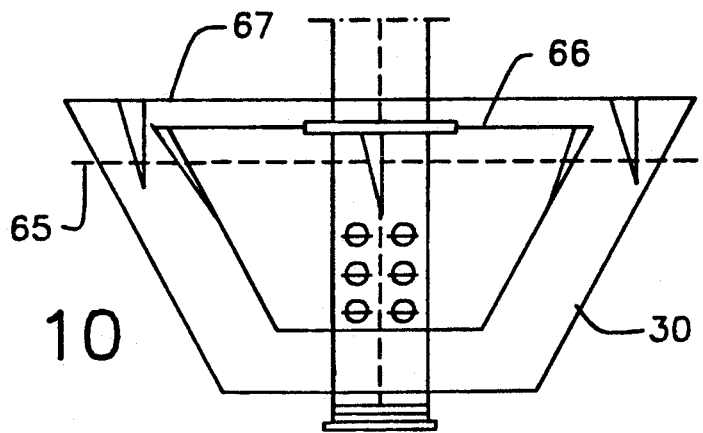

FIGS. 8 to 10 show intake systems corresponding to FIGS. 3 to 5 except that the respective outer cups 28, 29, and 30 do not have any air or hollow chambers. These embodiments also lie within the scope of the invention. This version of the outer cup is necessary in cases where relatively long-fiber particles accumulate in solutions taken in, whereby the fibers can be separated through the relatively large outer cup space.

Figure 11:
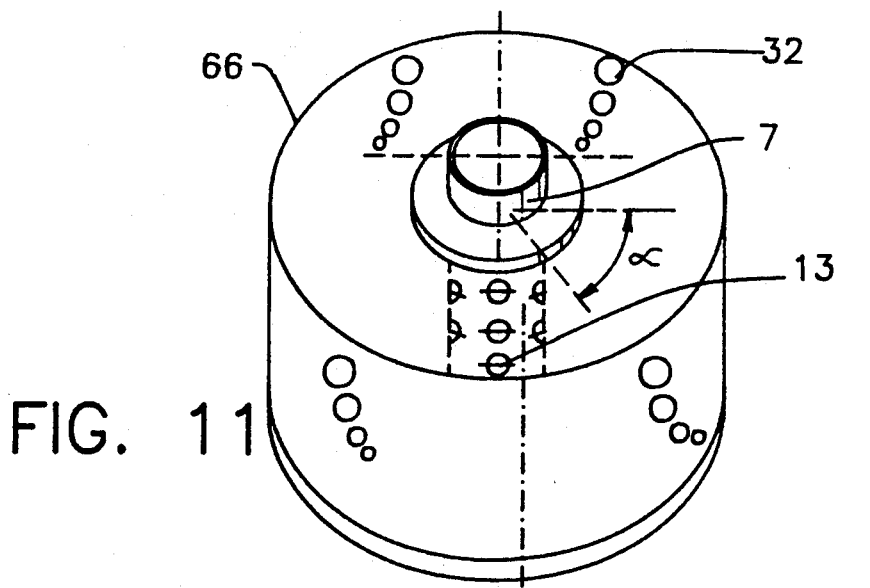
FIG. 11 shows another embodiment of the suction extraction system.

FIG. 11 shows how the openings 13 in the intake pipe 7 are offset by an angle α in relation to the openings 32 of the inner or outer cup.

The foam collar 34 according to the invention within the intake system with the inner cup 33 is shown in FIGS. 12 and 13. The foam collar 34 can have openings in the form of holes 35 or slots 36.

Figure 14:
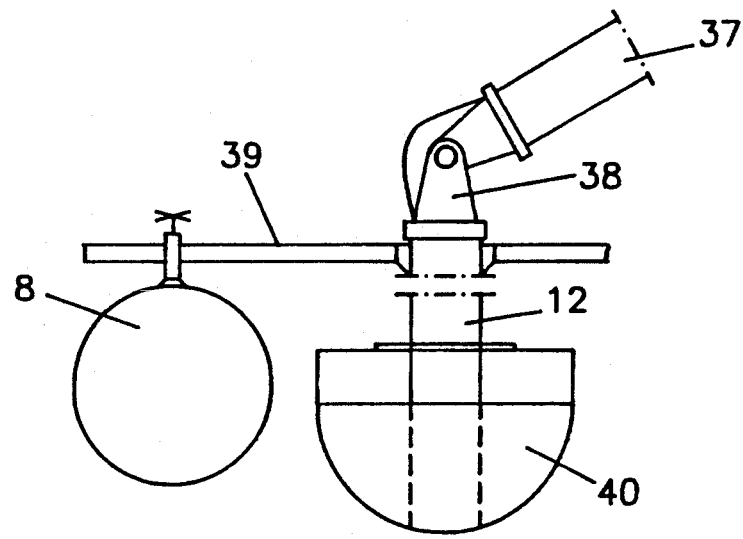
FIGS. 14 and 15 show suction extraction system with a a universal joint in yet another embodiment of the invention.
Figure 15:
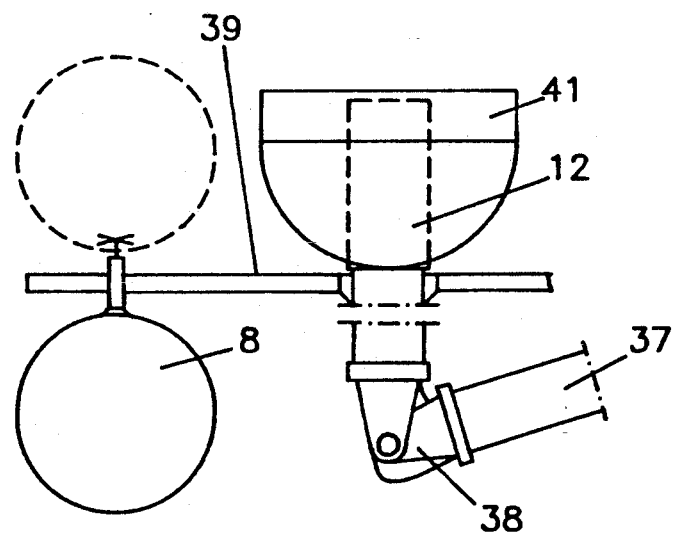

FIGS. 14 and 15 show how the position of the intake system relative to the liquid surfaces can be maintained, even with different and changing liquid levels, by means of a universal joint 38 on the intake pipe 37. In this case, the float 8 is connected to the intake system by a rod 39. As also shown in FIGS. 14 and 15, the liquid can be withdrawn from the inner bowl 41 or 40 both from below and from above, respectively. However, in either configuration the opening of the bowl 40 or 41 faces upwards.

Figure 16:
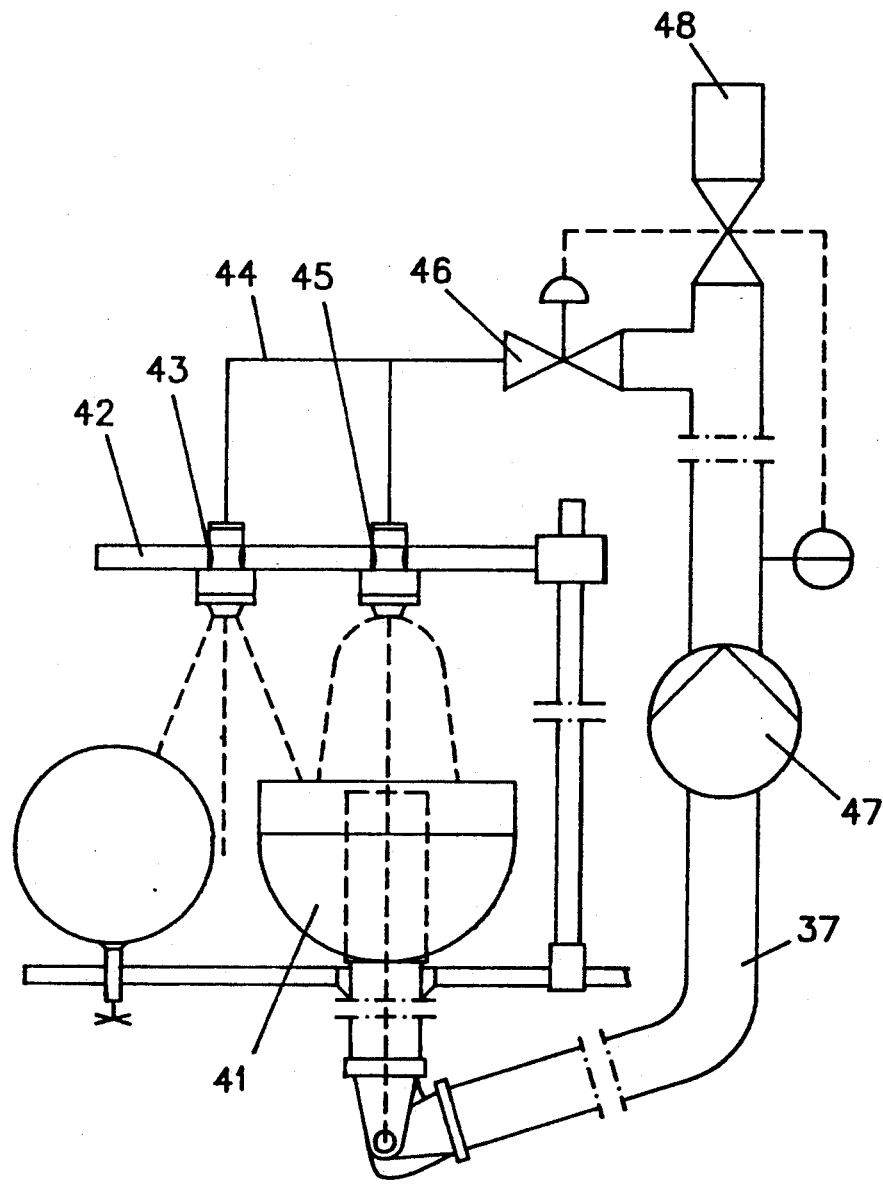
FIG. 16 shows a suction extraction system with a nozzle arrangement in another embodiment of the invention.

Another improvement is shown in FIG. 16. A flat-jet nozzle stock 43 and a full-cone nozzle stock 45, for example, are fixed to a nozzle bar 42, for spraying the liquid brought in through the branch 44 onto the intake system 41 or its surroundings via nozzles 43 and 45. A suction pump 47 is arranged in the intake pipe 37 for transporting liquid through a pressure pipe 48. The branch 44 leads off from the pressure pipe 48. Installed in the branch 44 is a secondary flow valve 46 which is controlled by differences in pressure. In the event of a fall in pressure behind the pump 47, valve 46 to provide a path opens for the liquid to flow to the nozzles 31.

Figure 17:
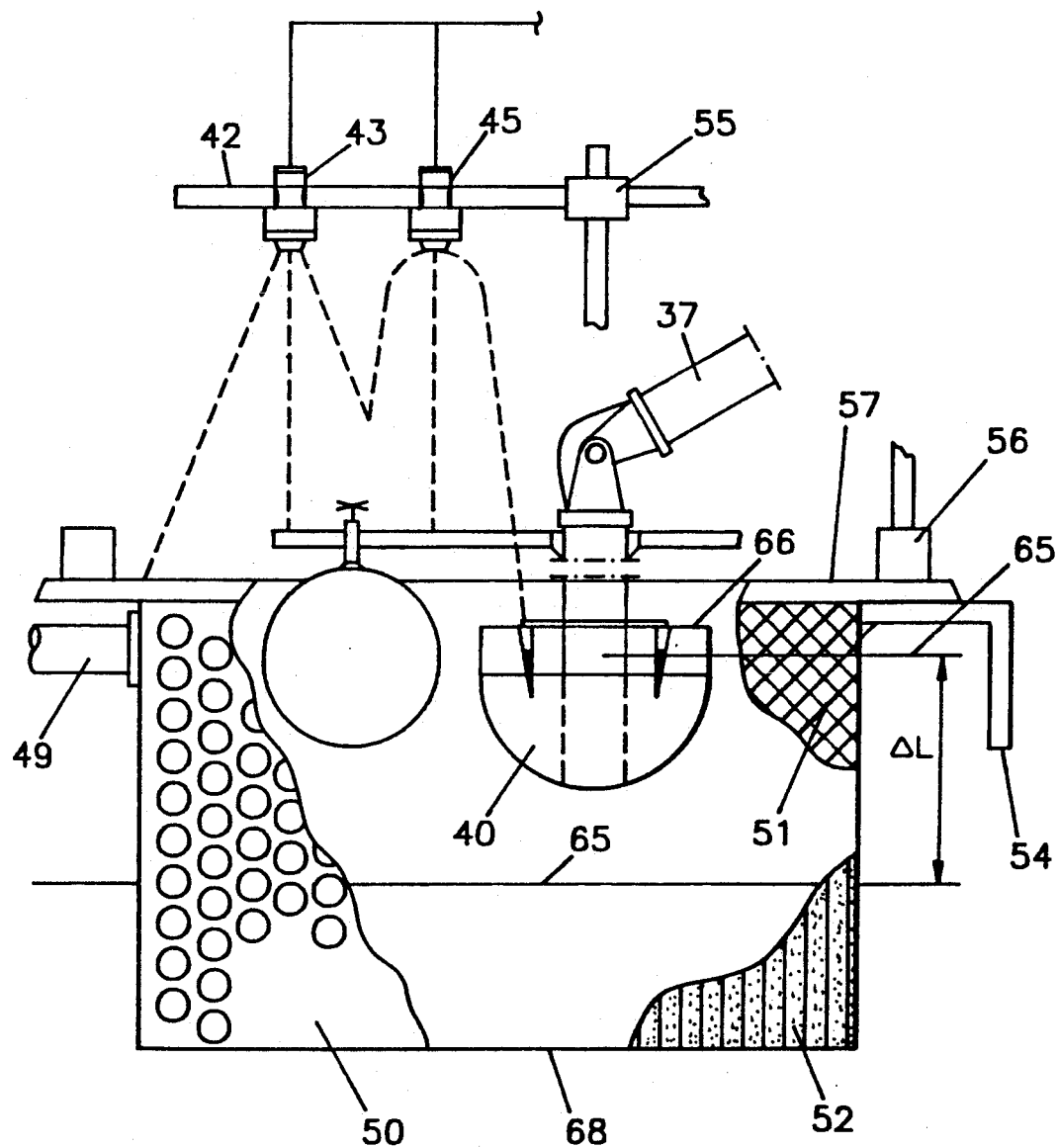
FIG. 17 shows a suction extraction system with a foam basket in one embodiment of the invention.

FIG. 17 shows an embodiment of the invention which is of advantage in the event of particularly intensive foaming and solids agglomeration. Arranged around the entire intake system, including bowl 66 is a foam basket 50,51,52 with a base 68, which is made of either perforated sheet metal 50, stamped sheet metal 52, wire gauze 51 or any other liquid-permeable material. The depth of the foam basket 50,51,52 adapted to the change ΔL between in the liquid levels 65. The foam basket 50,51,52 does not float on the liquid but is fixed by means of a connection 49 and a fastening clip 54. The references 55 and 56 denote vertical and horizontal support clips for adjusting the optimal spraying distance for the nozzle bar 42. The opening of the foam basket 50,51,52 is mostly covered by a cover plate 57.

Figure 18:
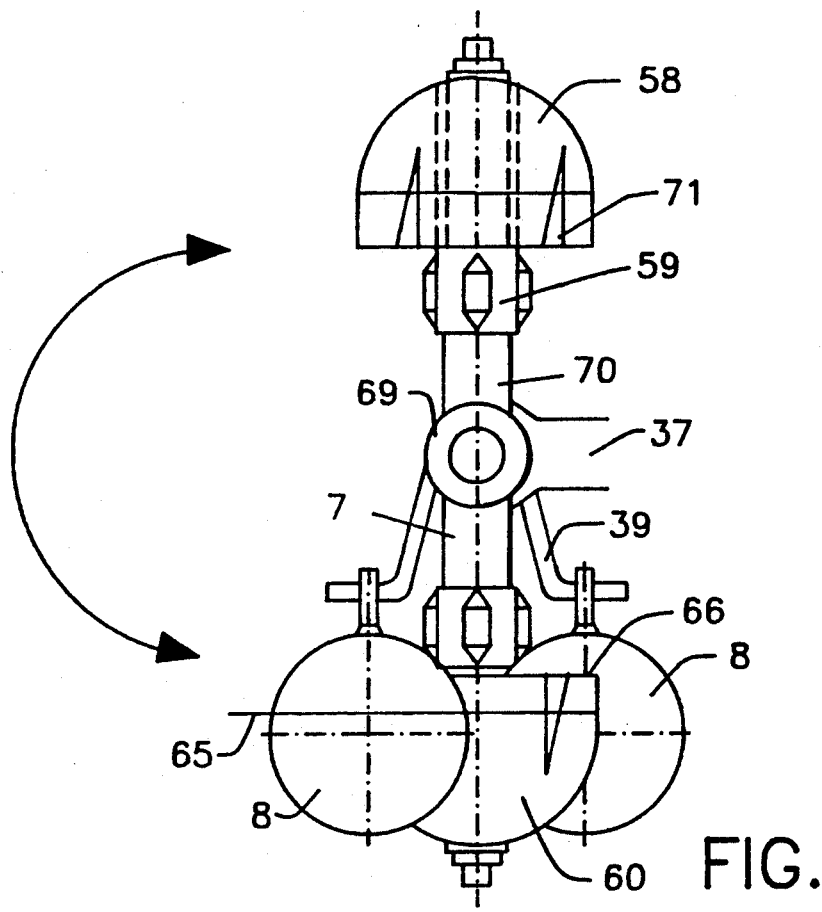
FIG. 18 is a side elevation of a double intake system with a reversing joint in another embodiment of the invention.
Figure 19:
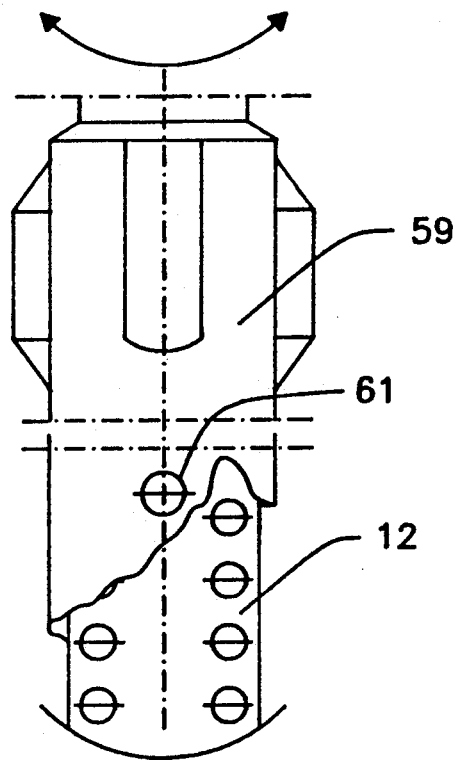
FIG. 19 shows a detail from FIG. 18.

A particularly simple cleaning system is shown in FIGS. 18 and 19. In addition to the intake system mentioned above, a second intake system with a second intake pipe 70 and openings 71 in the second intake cup 58 is mounted on the intake pipe 37 and the reversing joint 69 arranged thereon. The two intake systems are offset through 180° relative to one another and are rigidly interconnected so that, when one intake system leaves the liquid, the other intake system dips into the liquid. However, the floats 8 shown do not change position. In addition, FIG. 19 in particular shows a closure sleeve 59 for the suction holes of the intake pipe 70 or 7. The closure sleeve 59 also has holes 61 which, depending on the angular position of the closure sleeve 59, either coincide with, or close, the openings in the intake pipe 70 or 7. To clean an intake system which has been removed from the liquid by turning, the closure sleeve 59 is turned so that the openings in the intake pipe 12 are closed.

Figure 20:
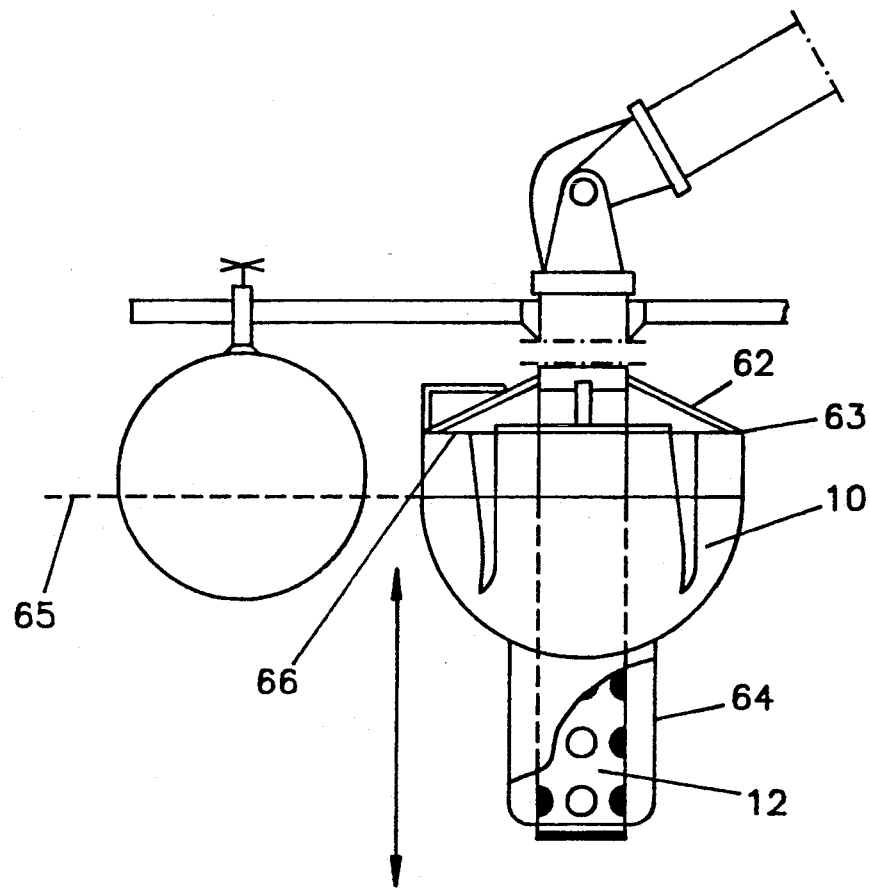
FIG. 20 is a side elevation of another intake system for an embodiment of the invention.

Finally, FIG. 20 shows an embodiment in which the outer suction cup 10 can be moved vertically together with a stripper ring 63 along the intake pipe 12 in order to flush out solids which have accumulated. A coaxial outer pipe 64 is also provided, its function being to facilitate cleaning of the bores or slots of the inner suction pipe because it is formed with a screwthread. The reference 62 denotes the holding and pull rod for the bowl 10.

Figure 21:
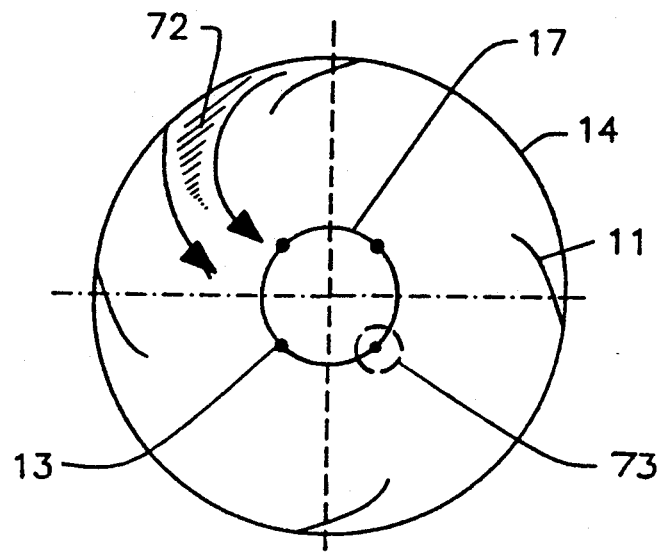
FIG. 21 is a plan view of the suction extraction system shown in FIG. 3.
Figure 22:
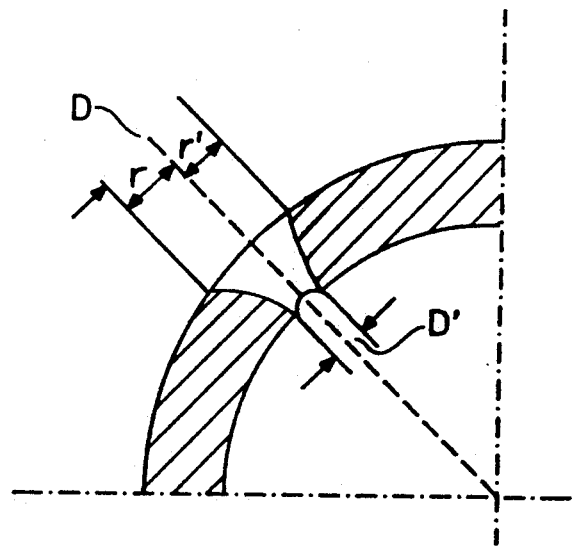
FIG. 22 is an enlarged view of detail 73 in FIG. 21.

FIG. 21 is a plan view of an intake cup 17 corresponding to FIG. 3. It has been found that layers of liquid suction-extracted from the surface can be pumped off sufficiently quickly and free from gas if the bores are offset in relation to the outer slot 11, and are slightly oblique and conical in shape. The typical, centripetally directed flow pattern 72 shown in FIG. 21 is developed in this example. It is also of advantage if, in the case of the bore 13 in the inner cup 17, the diameter D on the outside is larger than the diameter D' on the inside, as shown in FIG. 22. In addition, the bore 13 should be asymmetrical. This is shown in FIG. 22 where the radius r is larger than the radius r'. The advantages of the centripetal flow pattern 72 lie in the retention of solids, the preferred "running" of the surface layers into the cup at a relatively fast rate, and the preliminary separation of cuttings, etc. The advantages of the suction holes 27 in the outer cup shown in FIGS. 6 and 7 are always obtained when "floating" metal cuttings, for example aluminium cuttings, are to be retained.

Air chambers without floats 8 are sufficient for operations or systems providing adequate vertical guiding. However, floats 8 are necessary when strong turbulence causes the suction cup to tumble or tilt, although the air chambers within the suction cup considerably reduce the size of the floats 8, which is of advantage for small container openings.

Although various embodiments of the invention have been described and illustrated herein, they are not meant to be limiting. Those of skill in the art may recognize certain modifications to these embodiments, which modifications are meant to be covered by the spirit and scope of the appended claims.

LIST OF REFERENCE NUMERALS

1: Float fixing element
2: Horizontal intake pipe
3: Fixing element (setscrew) for leveling the float (vertical adjustment)
4: Holding ring or holding clip
5: Guide rod for one or more floats
6: Float guide sleeve
7: Vertical intake pipe
8: Float
9: Pipe collar
10: Intake cup (hemispherical)
11: Intake slot
12: Vertical intake pipe with suction holes
13: Intake pipe perforation
14: Outer cup
15: Suction slot of the outer cup
16: Suction slot of the inner cup
17: Inner cup
18: Air chamber
19: Outer funnel
20: Suction slot of the outer funnel
21: Suction slot of the inner funnel
22: Inner funnel
23: Outer cup
24: Suction slot of the outer bowl
25: Suction slot of the inner bowl
26: Inner bowl
27: Suction holes of the inner cup
28: Outer cup without air chamber
29: Outer funnel without air chamber
30: Outer trapezium without air chamber
31: Offset angle
32: Suction holes of the inner and outer cup
33: Inner cup
34: Foam collar
35: Perforation in foam collar, offset
36: Slot in foam collar, offset
37: Intake line
38: Universal joint
39: Rod
40: Suction system
41: Suction system for withdrawing liquid from the bowl from below
42: Nozzle bar
43: Flat jet nozzle stock
44: Branch
45: Full-cone nozzle stock
46: Secondary flow valve controlled by pressure differences
47: Suction pump
48: Pressure line
49: Fixing connection
50: Foam basket (perfoated sheet metal)
51: Foam basket (stamped sheet metal)
52: Foam basket (wire gauze)
53: Change in bath level
54: Fixing clip
55: Horizontal support clip
56: Vertical support clip
57: Basket frame with fixing elements 58: Suction cup raised from liquid
59: Suction hole closure sleeve
60: Operable suction cup
61: Corresponding bore
62: Holding and pull rod for cleaning bowl
63: Stripper ring
64: Outer pipe
65: Liquid surface
66: Rim
67: Rim
68: Base
69: Reversing joint
70: Second intake pipe
71: Opening
72: Flow
73: Detail.

What is claimed is:

1. A suction extractor for liquids with a tendency to foam, comprising: an intake system including an intake pipe through which the liquid is drawn at one end and which has openings at its other end, an inner bowl surrounded by an outer bowl, said inner bowl being mounted upon and surrounding said other end of said intake pipe, said inner bowl having a top opening, said inner bowl including a top rim surrounding its top opening, whereby when said suction extractor is placed in its operating orientation, liquid situated in the inner bowl can be taken in by the intake pipe through the holes in the intake pipe proximate where it enters into a bottom portion of said inner bowl, said inner bowl including at least one opening adjacent its top rim, said outer bowl also having a top opening facing in the same direction as the top opening of said inner bowl, said outer bowl having a top rim surrounding its top opening, whereby said extractor is oriented in its operating position, for providing that the liquid situated inside the outer bowl flows into the inner bowl, said outer bowl including at least one opening adjacent its top rim, said extractor further comprising a float connected by an extending arm to said intake pipe, whereby said float is arranged for maintaining said top rims of said inner and outer bowls above a liquid surface during operation of the extractor, and said openings of the outer bowl being offset relative to the openings of the inner bowl in such a way that they do not each lie on a common radial line extending perpendicularly from a longitudinal axis of said intake pipe through any one of said openings.

2. A suction extractor as claimed in claim 1, further including closed hollow chambers inside the outer bowl in its lower portion relative to its top rim.

3. A suction extractor as claimed in claim 1, wherein the openings of the intake pipe are offset relative to the openings of the inner bowl in such a way that they do not lie on a radial line extending perpendicularly from the longitudinal axis of said intake pipe through any one of said openings.

4. A suction extractor as claimed in claim 1, further including a collar to reduce foaming, said collar being arranged between the intake pipe and the inner bowl, said collar being in the form of a cylindrical casing with openings offset relative to the openings of the adjoining walls of said intake pipe and said inner bowl in such a way that they do not lie on a radial line extending perpendicularly from the longitudinal axis of said intake pipe through any one of said openings.

5. A suction extractor as claimed in claim 1, further including a universal joint connected between the one end of said intake pipe and an intake line leading away from the intake pipe.

6. A suction extractor as claimed in claim 1, further including a collar to reduce foaming arranged between the inner bowl and the outer bowl, the foam collar being in the form of a cylindrical casing with openings that are offset relative to the openings of opposing walls of said inner and outer bowls in such a way that they do not lie on a common radial line extending perpendicularly from the longitudinal axis of said intake pipe through any one of said openings.

7. A suction extractor for liquids with a tendency to foam, comprising: an intake system including an intake pipe through which the liquid is drawn in at one end, said intake pipe having openings at its other end, a bowl surrounding said other end, said bowl having a top opening, whereby said top opening is oriented in its operating position for providing that the liquid situated in the bowl can be taken in by the intake pipe, said bowl including a top rim surrounding its top opening, said bowl including a wall having at least one opening of which lies proximate its top rim, and further comprising a float connected by an extended arm to a portion of said intake pipe, whereby said float is arranged for providing that said top rim of the bowl lies above a liquid surface in the operating position with said at least one opening at least partially located below the liquid surface, an intake line, a pump having a suction side connected to said intake pipe and a pressure side connected to said intake line, a valve positioned in a branch of said intake line leading to at least one nozzle which is aligned for spraying liquid onto the liquid surface surrounding the intake system, and means responsive to pressure in the intake pipe for opening said valve in the event of a fall in the pressure in the intake line lying on the pressure side of the pump.

8. A suction extractor as claimed in claim 7, further including a liquid permeable basket having an open top facing in the same direction as said top opening of the bowl, said permeable basket surrounding said intake pipe, the bowl, and the float, and wherein said basket is placed sufficiently deep so that the liquid surface lies above a bottom surface of the basket.

9. A suction extractor for liquids with a tendency to foam, comprising: a first intake system including an intake pipe, through which the liquid is taken in at one end, said intake pipe having openings at its other end, a bowl arranged to surround said other end, said bowl having a top opening, said bowl including a top rim surrounding said top opening, whereby in the operating position of the suction extractor, said bowl is oriented to provide that liquid situated in the bowl can be taken in by the intake pipe, said bowl having an least one opening adjacent said top rim, whereby said at least one opening is positioned for permitting the flow of liquid into said bowl when substantially immersed in said liquid, an intake line, and further comprising a float connected by an extending arm to an end portion of said intake line and spaced from the top opening of said bowl, whereby said float is arranged for providing that a rim of the bowl lies above the liquid surface in the operating position, a reversing joint mounted on said intake line, the intake line of the first intake system being mounted to said reversing joint, a second intake system being mounted upon said reversing joint, said second take system comprising at least one bowl and a second intake pipe, and which corresponds in its construction to said first intake system, said second intake system extending from said reversing joint in a direction diametrically opposite to that of said first intake system, said reversing joint including means for individually pivoting said two intake systems into and out of the liquid about an axis of said reversing joint, and each said intake pipe including a closure means for closing the openings at said other end of the intake pipe of each intake system.

10. A suction extractor as claimed in claim 9, wherein the bowls of said first and second intake systems are fixedly connected to said closure means, and wherein each respective said bowl and closure means can be moved along the respective said intake pipe.

* * * * *